(12) United States Patent
Buresh

(10) Patent No.: US 7,431,380 B1
(45) Date of Patent: Oct. 7, 2008

(54) LOUVER KIT

(76) Inventor: Theodore Allen Buresh, W14364 Lyngen Rd., Blair, WI (US) 54616

( * ) Notice: Subject to any disclaimer, the term of this patent is extended or adjusted under 35 U.S.C. 154(b) by 218 days.

(21) Appl. No.: 11/358,364

(22) Filed: Feb. 21, 2006

Related U.S. Application Data

(60) Provisional application No. 60/656,293, filed on Feb. 24, 2005.

(51) Int. Cl.
*B60R 27/00* (2006.01)
(52) U.S. Cl. .................................. 296/180.1
(58) Field of Classification Search .......... 296/180.1, 296/180.2, 180.4; 180/903
See application file for complete search history.

(56) References Cited

U.S. PATENT DOCUMENTS 5,826,393 A * 10/1998 Wenzlaff et al. ............. 52/473
6,412,853 B1 * 7/2002 Richardson ............. 296/180.1

* cited by examiner

*Primary Examiner*—Lori L Lyjak
(74) *Attorney, Agent, or Firm*—Tipton L. Randall

(57) ABSTRACT

A louver decoration kit includes a plurality of louver members, each louver member having a concave body portion with a peripheral, planar base portion extending along a first selected section of the concave body portion. The planar base portion has a flat attachment surface opposite the concave body portion. Also included is a second, selected section of the concave body portion having an elevated edge positioned at a selected angle to the planar base portion. The louver members have sufficient flexibility that the flat attachment surface of each louver member is adapted to conform to both planar and curved mounting surfaces. The louver decoration kit also includes an adhesive material adapted for application to the attachment surface of the planar base portion of the louver member to provide attachment of the louver member to a selected mounting surface.

20 Claims, 7 Drawing Sheets

LOUVER KIT

CROSS-REFERENCE TO RELATED APPLICATIONS, IF ANY

This application claims the benefit under 35 U.S.C. § 119 (e) of provisional application Ser. No. 60/656,293, filed 24 Feb., 2005. Application Ser. No. 60/656,293 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a louver kit and, more particularly, to a louver kit adapted for use by an individual and, most particularly, to a louver kit that provides all materials for attaching a plurality of louver members to a selected surface.

2. Background Information

Louvers are often used to ventilate a particular surface and allow air to flow from one side of the surface to the other. The louver includes an aperture in the surface with a raised covering to prevent precipitation from entering the aperture from the outside. Louvers are frequently employed on the outer surfaces of vehicles in order to ventilate the engine compartment and/or the passenger compartment. Often, a plurality of louvers is employed for such purposes, and the louvers are arranged in rows to provide a pleasing appearance. Manufacture of the various body panels containing the louvers for a motor vehicle adds significant cost to the price of the vehicle.

Such louvered vehicle panels are quite decorative and many individuals would prefer to have a vehicle with such louvers. The added cost for panels including louvers often deters individuals from such a purchase. When only the decorative look of a louvered surface is desired, without the ventilation feature, there is a need for an item providing only the look of a louver.

Applicant has invented a louver kit to meet this need. The kit allows an individual to fasten a plurality of louver members to the surface of a motor vehicle, for example, at a reasonable cost.

SUMMARY OF THE INVENTION

The invention is directed to a louver decoration kit, which includes a plurality of louver members. Each louver member has a concave body portion with a peripheral, planar base portion extending along a first selected section of the concave body portion. The planar base portion has a flat attachment surface opposite the concave body portion. Also included is a second, selected section of the concave body portion, having an elevated edge positioned at a selected angle to the planar base portion. The louver members have sufficient flexibility that the flat attachment surface of each louver member is adapted to conform to both planar and curved mounting surfaces. The kit also includes an adhesive material adapted for application to the attachment surface of the planar base portion of the louver member to provide attachment of the louver member to a selected mounting surface.

In a further embodiment of the invention, the louver decoration kit includes a template member adapted for marking attachment locations for the plurality of louver members on a selected mounting surface. In yet a further embodiment of the invention, the louver decoration kit includes a cleaning material adapted for preparing the selected mounting surface for attachment of the louver members thereto.

DESCRIPTION OF THE EMBODIMENTS

Nomenclature

10 Louver Decoration Kit
20 Louver Members
25 Concave Body Portion of Louver Member
30 Planar Base Portion of Louver Member
35 Flat Attachment Surface of Base Portion
40 Elevated Edge of Body Portion
50 Adhesive Material
55 Double Surface Tape
60a First Side of Tape
60b Second Side of Tape
65 Removable Film
70 Contained Fluid Adhesive
75 Air-Tight Container for Adhesive
80 Template Member
90 Cleaner Material
95 Cleaning Fluid
99 Container for Cleaning Fluid
A Angle
M Mounting Surface
V Motor Vehicle

Construction

The invention is a louver decoration kit adapted for mounting a plurality of louver members to a selected mounting surface. The louver decoration kit includes a plurality of louver members, each louver member having a concave body portion with a peripheral, planar base portion extending along a first selected section of the concave body portion. The planar base portion has a flat attachment surface opposite the concave body portion. Also included is a second selected section of the concave body portion having an elevated edge positioned at a selected angle to the planar base portion. The louver members have sufficient flexibility that the flat attachment surface of each louver member is adapted to conform to both planar and curved mounting surfaces. The louver decoration kit also includes an adhesive material adapted for application to the attachment surface of the planar base portion of the louver member to provide attachment of the louver member to a selected mounting surface.

In a further embodiment of the invention, the louver decoration kit includes a template member adapted for marking attachment locations for the plurality of louver members on a selected mounting surface. In yet a further embodiment of the invention, the louver decoration kit includes a cleaning material adapted for preparing the selected mounting surface for attachment of the louver members thereto.

Figure 1:
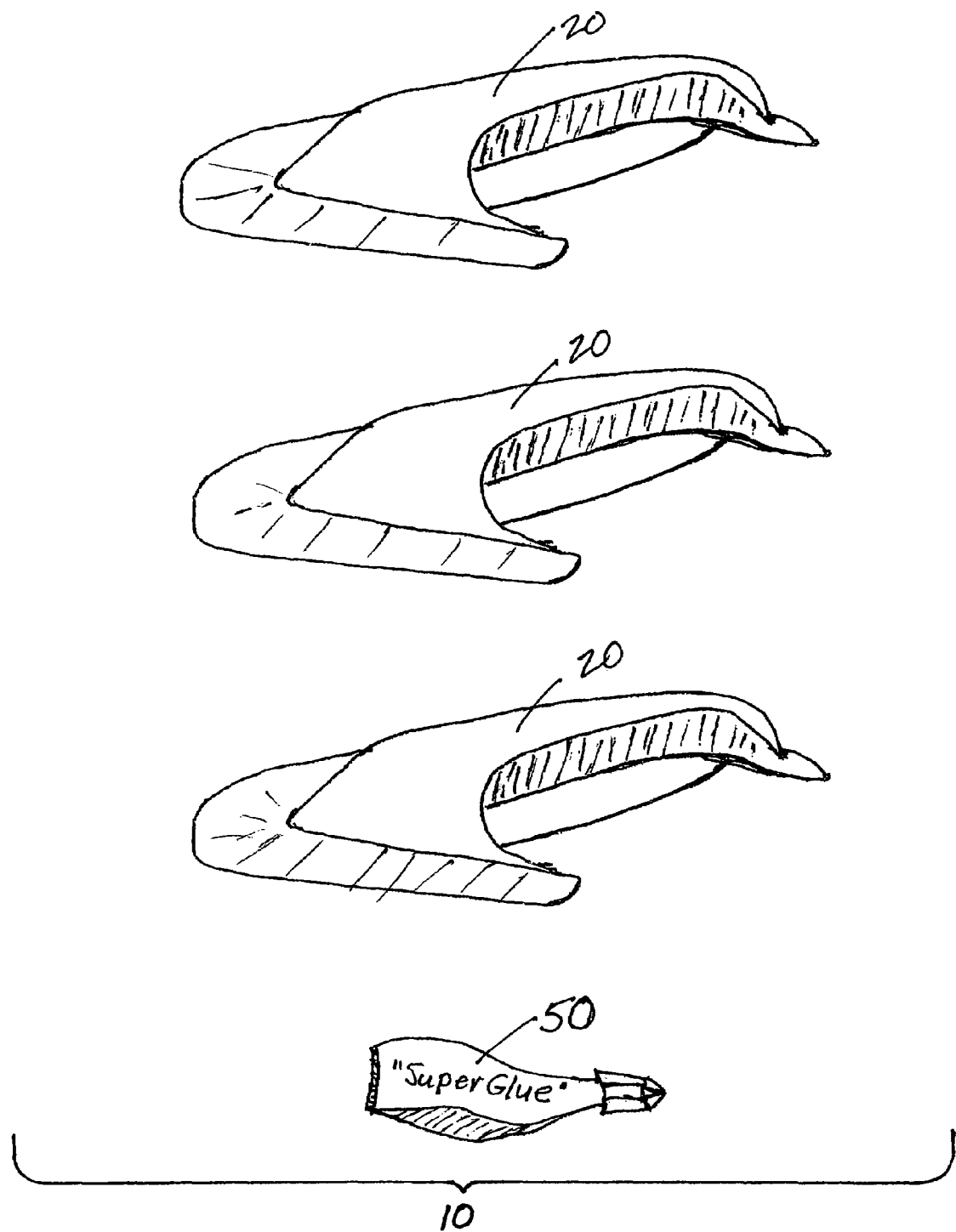
FIG. 1 is a representation of one embodiment of the louver decoration kit of the present invention.
Figure 2:
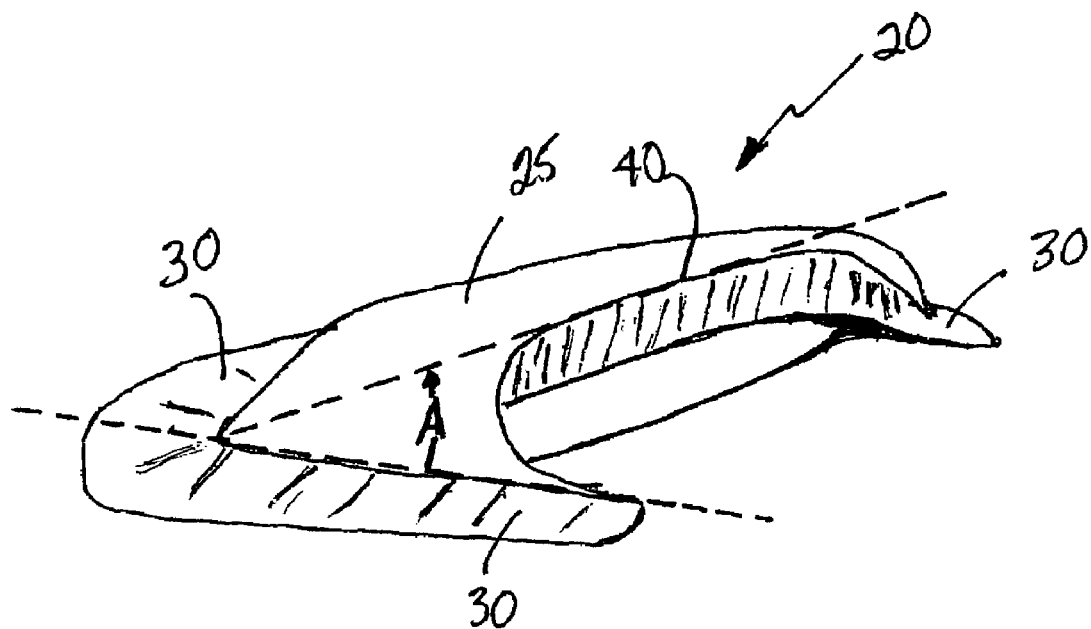
FIG. 2 is a perspective view of a one embodiment of the louver member of the louver decoration kit of the present invention.
Figure 3:
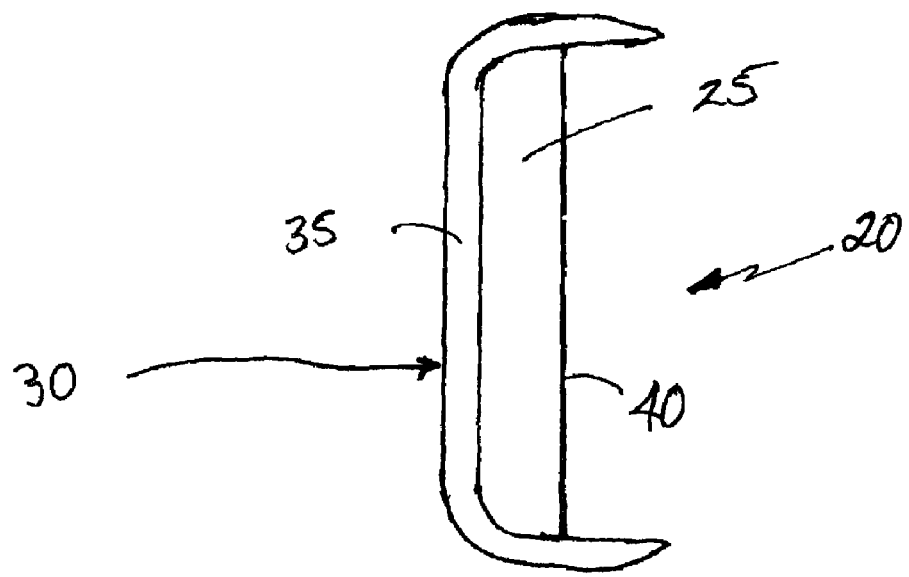
FIG. 3 is a bottom view of the FIG. 2 embodiment of the louver member of the louver decoration kit of the present invention.
Figure 4:
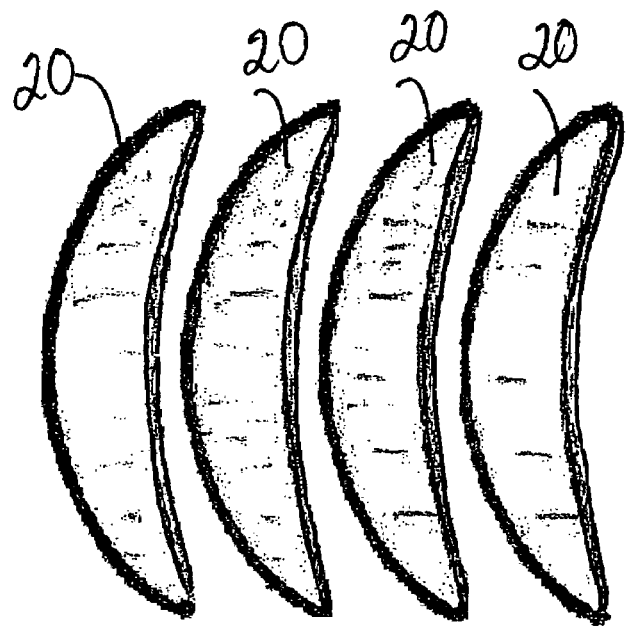
FIG. 4 is a perspective view of another embodiment of the louver members of the louver decoration kit of the present invention.
Figure 5:
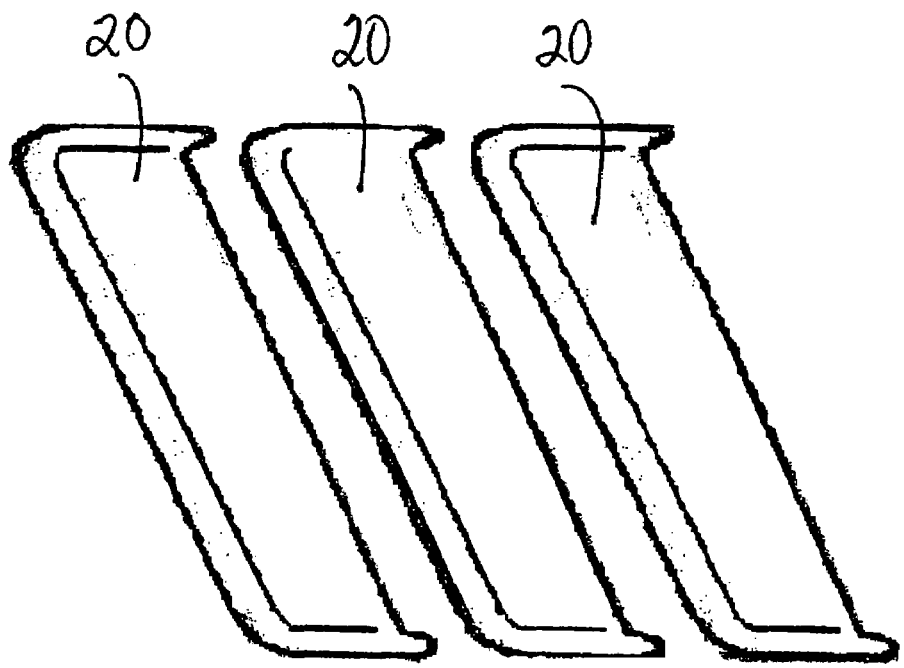
FIG. 5 is a perspective view of yet another embodiment of the louver members of the louver decoration kit of the present invention.

Referring now to FIGS. 1-3, one embodiment of the louver decoration kit is illustrated. The louver decoration kit 10 includes a plurality of louver members 20, each louver member having a concave body portion 25 with a peripheral, planar base portion 30 extending along a first selected section of the concave body portion 25. The planar base portion 30 has a flat attachment surface 35 opposite the concave body portion 25. Also included is a second selected section of the concave body portion 25 having an elevated edge 40 positioned at a selected angle A to the planar base portion 30. The angle A is selected to provide separation of the elevated edge 40 from the mounting surface M, upon which the flat attachment surface 35 of the louver member 25 is secured.

The louver members 20 have sufficient flexibility that the flat attachment surface 35 of each louver member 20 is adapted to conform to both planar and curved mounting surfaces M. The louver decoration kit 10 also includes an adhesive material 50 adapted for application to the attachment surface 35 of the planar base portion 30 of the louver member 25 to provide attachment of the louver member 20 to the selected mounting surface M.

Figure 6:
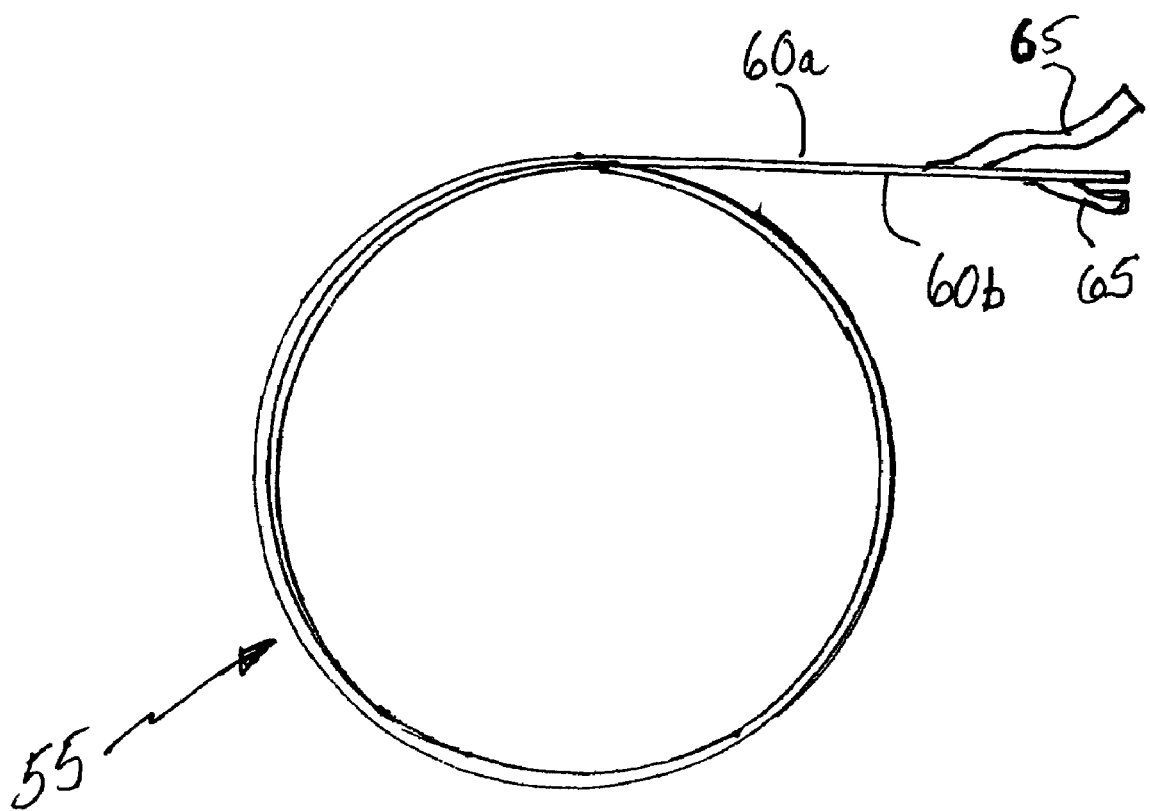
FIG. 6 is a perspective view of one embodiment of the adhesive material of the louver decoration kit of the present invention.

In one embodiment of the louver decoration kit 10 invention, the adhesive material 50 comprises a double-sided tape 55 having opposed adhesive surfaces 60a and 60b. The tape 55, illustrated in FIG. 6, can be supplied separately in the kit 10, with each adhesive surface 60a and 60b covered with a removable film 65. Alternatively, one adhesive surface 60a of a portion of the double-sided tape 55 is adhered to the flat attachment surface 35 of the louver members 20 and the other adhesive surface 60b covered with a removable film 65.

Figure 7:
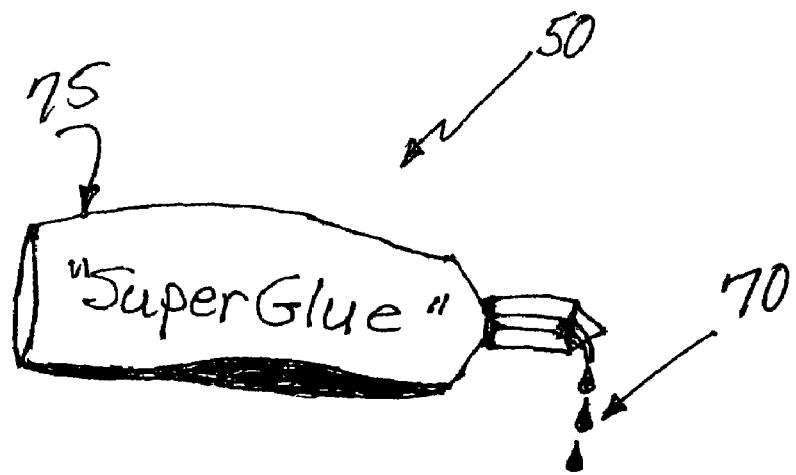
FIG. 7 is a perspective view of another embodiment of the adhesive material of the louver decoration kit of the present invention.

In another embodiment of the louver decoration kit 10 invention, the adhesive material 50 comprises a contained fluid adhesive 70 adapted for application to the flat attachment surface 35 of the planar base portion 30 of the louver member 20. Such a contained fluid adhesive 70 is illustrated in FIG. 7. For example, the contained fluid adhesive 70 can include a fast-setting vinyl polymer, commonly termed "super glue." This particular adhesive material 50 is contained in an airtight tube 75 and dispensed onto the flat attachment surface 35 just prior to placement of the louver member on the selected mounting surface M. The cured adhesive material 50 secures the louver member 20 to the selected mounting surface M.

Figure 8:
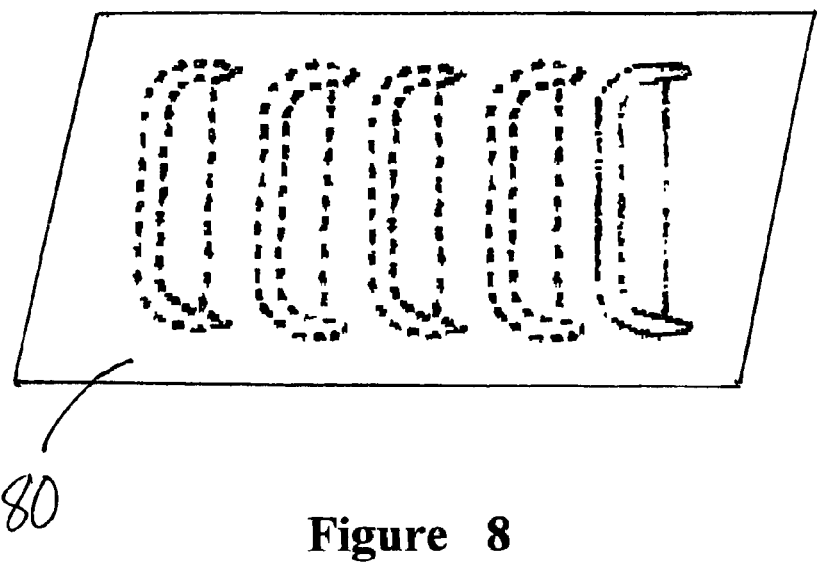
FIG. 8 is a perspective view of one embodiment of the template member of the louver decoration kit of the present invention.

In a further embodiment of the invention, the louver decoration kit 10 invention includes a template member 80 adapted for marking attachment locations for the plurality of louver members 20 on a selected mounting surface M. One template member 80, illustrated in FIG. 8, can be used to mark the position on the mounting surface M of each louver member 20 for attachment to that selected mounting surface M.

Figure 11:
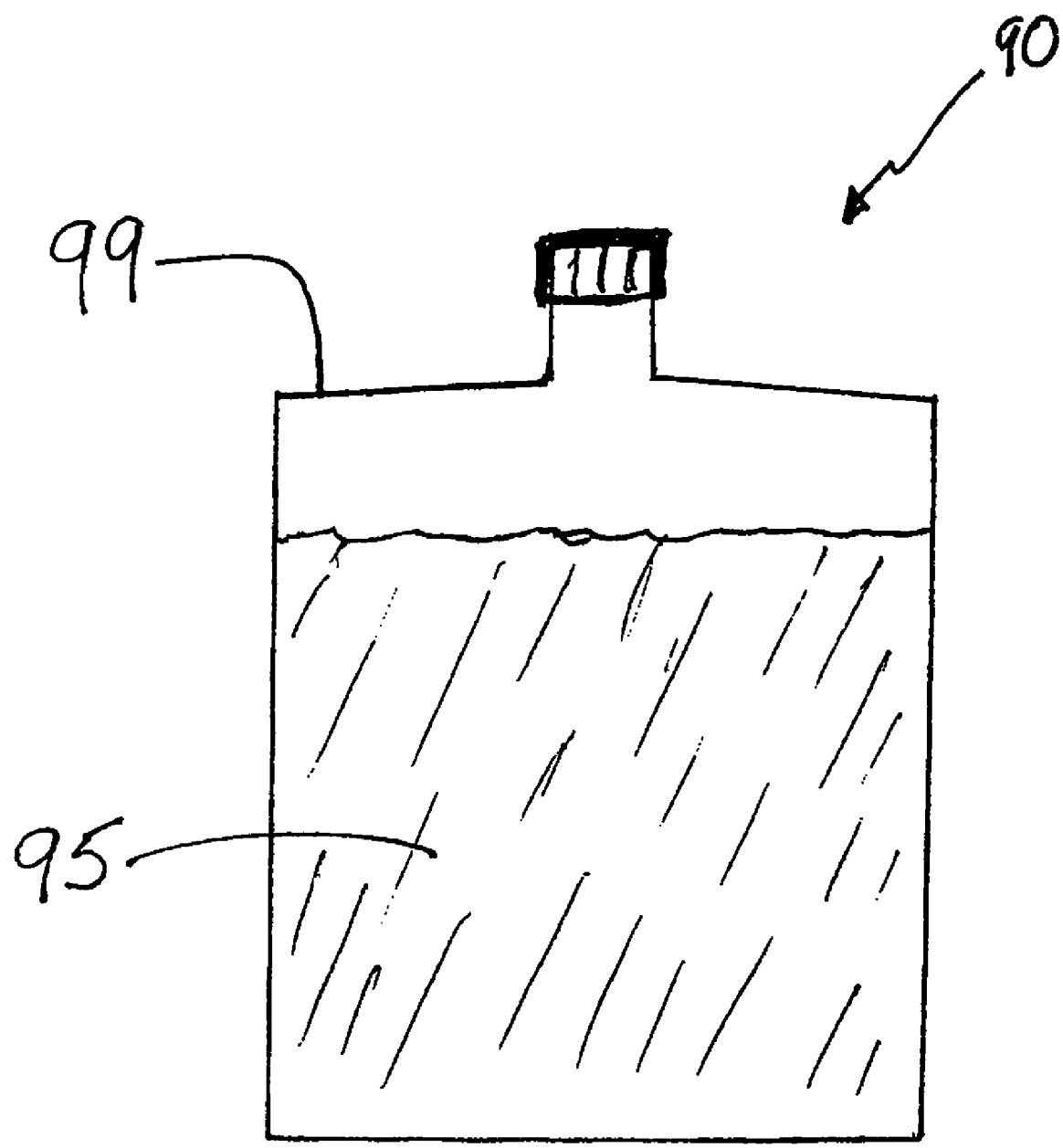
FIG. 11 is a perspective view of another embodiment of the adhesive material of the louver decoration kit of the present invention.

In yet a further embodiment of the invention, the louver decoration kit 10 invention includes a cleaning material 90 adapted for preparing the selected mounting surface M for attachment of the louver members 20 thereto by means of the adhesive material 50. For example, the cleaning material 90 can be a contained cleaning fluid 95, such as an alcohol, a hydrocarbon solvent or a chlorinated solvent, contained in a fluid-tight vessel 99 for such use, as illustrated in FIG. 11.

Figure 10:
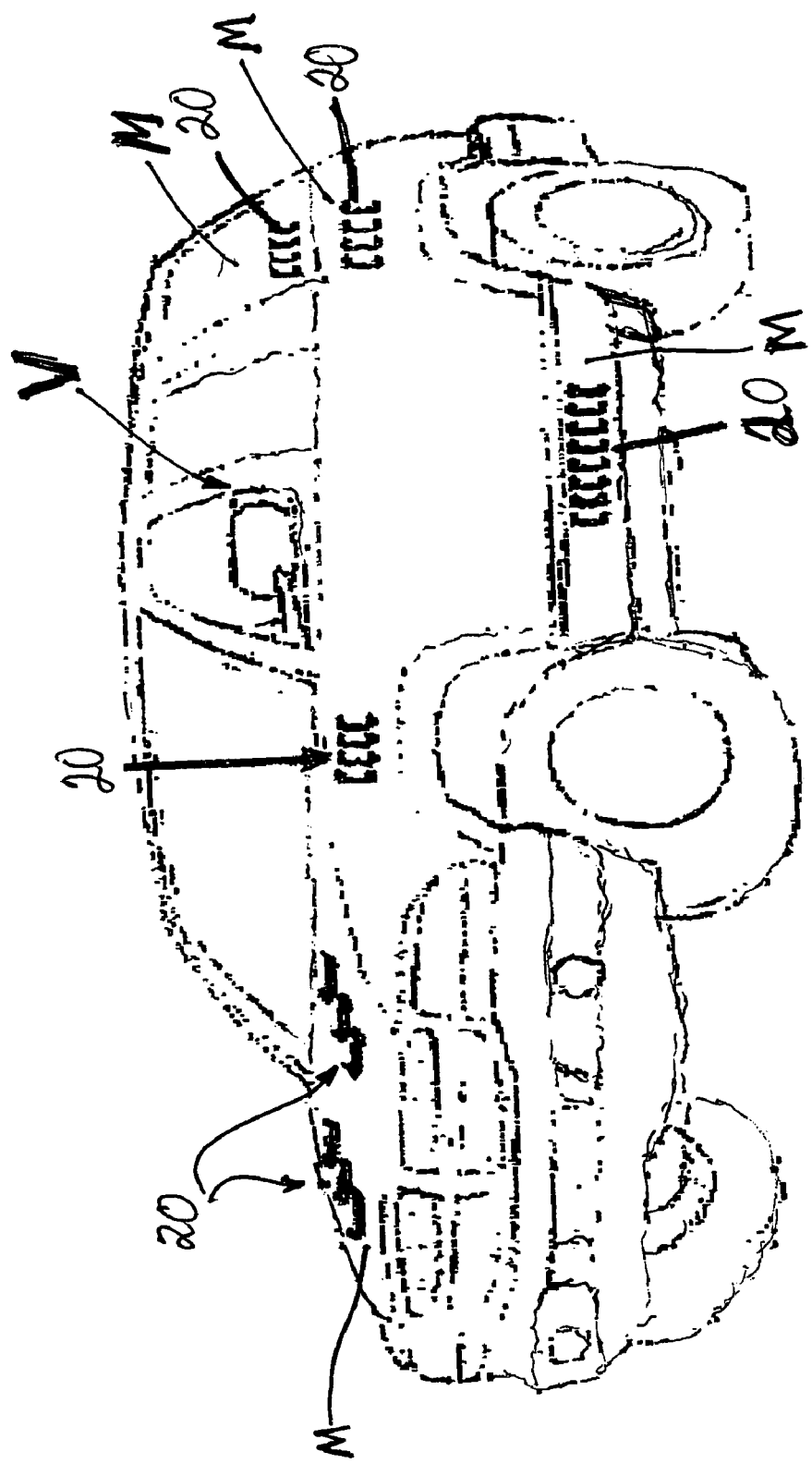
FIG. 10 is a perspective view of the plurality of louver members secured to a motor vehicle of the louver decoration kit of the present invention.

Referring now to FIG. 10, a motor vehicle V is illustrated having a plurality of louver members 20 secured to selected mounting surfaces M thereof. The louver members 20 of the louver decoration kit 10 are provided in a wide variety of sizes and shapes, several of which are illustrated in FIGS. 2-5. The louver members 20 can be fabricated from metallic material, such as sheet metal, which can be painted to match the motor vehicle color, or the metallic material polished to provide a contrasting appearance with that of the motor vehicle V. Alternatively, the louver members 20 can be fabricated from a polymeric resin material, which may be reinforced with fiber glass, and painted to match the motor vehicle color.

Figure 9:
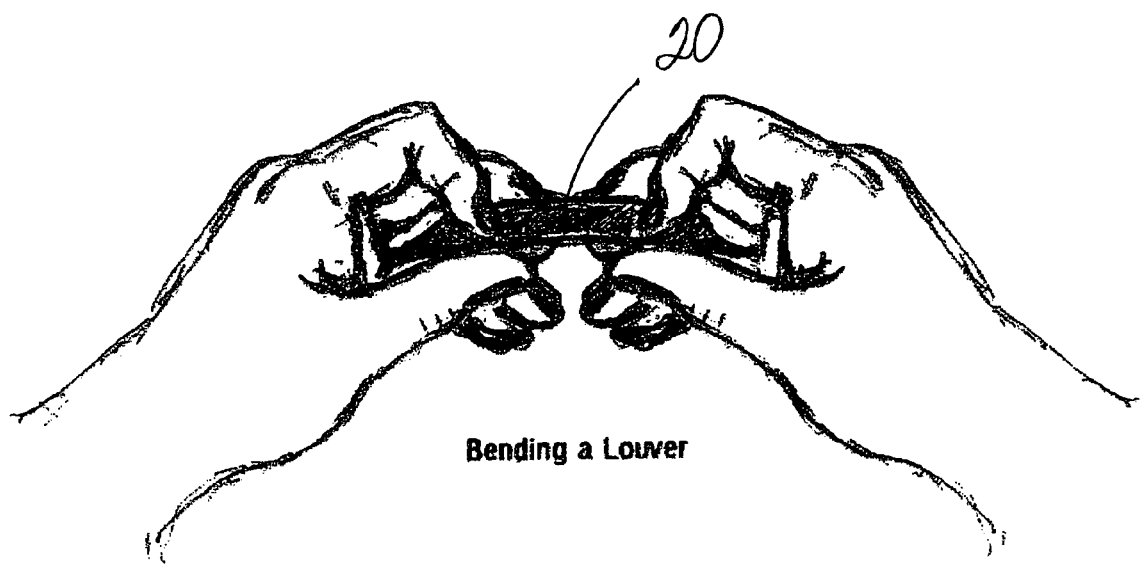
FIG. 9 is a perspective view of one of the louver members of the louver decoration kit of the present invention being bent to conform to the mounting surface to which the louver member is secured.

The selected mounting surface M upon which the louver members 20 are attached is often not completely planar or flat. This is particularly the case for motor vehicles V. The louver members 20 have sufficient flexibility that the flat attachment surface 30 of each louver member 20 is adapted to conform to both planar and curved mounting surfaces. The bending of one example of the louver member 20 is illustrated in FIG. 9.

While the invention has been particularly shown and described with reference to preferred embodiments thereof, it will be understood by those skilled in the art that various changes in form and details may be made therein without departing from the spirit and scope of the invention.

I claim:

1. A louver decoration kit comprising:
   a plurality of individual louver members, each louver member having a concave body portion with a peripheral, planar base portion extending along a first selected section of the concave body portion, the planar base portion having a flat attachment surface opposite the concave body portion, the planar base portion extending exterior and interior the concave body portion;
   a second selected section of the concave body portion having an elevated edge positioned at a selected angle to the planar base portion, the louver member having sufficient flexibility that the flat attachment surface is adapted to conform to both planar and curved mounting surfaces; and
   an adhesive material adapted for application to the attachment surface of the planar base portion of the louver member to provide attachment of the louver member to a selected mounting surface.

2. The louver decoration kit of claim 1, further including a template member adapted for marking attachment locations for the plurality of louver members on a selected mounting surface.

3. The louver decoration kit of claim 1, wherein the adhesive material is a tape having opposed adhesive sides.

4. The louver decoration kit of claim 3, wherein one adhesive side of the tape is adhered to the flat attachment surface of the planar base portion of the louver members and the opposed adhesive side of the tape is covered with a removable film.

5. The louver decoration kit of claim 1, wherein the adhesive material is a contained fluid adhesive adapted for application to the flat attachment surface of the planar base portion of the louver member.

6. The louver decoration kit of claim 1, wherein the louver members are fabricated from a metallic material.

7. The louver decoration kit of claim 1, wherein the louver members are fabricated from a polymeric resin material.

8. The louver decoration kit of claim 1, wherein the louver members are painted and polished.

9. The louver decoration kit of claim 1, further including a cleaning material adapted for preparing the selected mounting surface for attachment of the louver members thereto.

10. A louver decoration kit comprising:

a plurality of individual louver members, each louver member having a concave body portion with a peripheral, planar base portion extending along a first selected section of the concave body portion, the planar base portion having a flat attachment surface opposite the concave body portion, the planar base portion extending exterior and interior the concave body portion;

a second selected section of the concave body portion having an elevated edge positioned at a selected angle to the planar base portion, the louver member having sufficient flexibility that the flat attachment surface is adapted to conform to both planar and curved mounting surfaces;

an adhesive material adapted for application to the attachment surface of the planar base portion of the louver member to provide attachment of the louver member to a selected mounting surface; and a template member adapted for marking attachment locations for the plurality of louver members on the selected mounting surface.

11. The louver decoration kit of claim 10, wherein the adhesive material is a tape having opposed adhesive sides.

12. The louver decoration kit of claim 11, wherein one adhesive side of the tape is adhered to the flat attachment surface of the planar base portion of the louver members and the opposed adhesive side of the tape is covered with a removable film.

13. The louver decoration kit of claim 10, wherein the adhesive material is a contained fluid adhesive adapted for application to the flat attachment surface of the planar base portion of the louver member.

14. The louver decoration kit of claim 10, wherein the louver members are fabricated from a metallic material.

15. The louver decoration kit of claim 10, wherein the louver members are fabricated from a polymeric resin material.

16. The louver decoration kit of claim 10, wherein, the louver members are painted and polished.

17. The louver decoration kit of claim 10, further including a cleaning material adapted for preparing the selected mounting surface for attachment of the louver members thereto.

18. A louver decoration kit comprising:

a plurality of individual louver members, each louver member having a concave body portion with a peripheral, planar base portion extending along a first selected section of the concave body portion, the planar base portion having a flat attachment surface opposite the concave body portion, the planar base portion extending exterior and interior the concave body portion;

a second selected section of the concave body portion having an elevated edge positioned at a selected angle to the planar base portion, the louver member having sufficient flexibility that the flat attachment surface is adapted to conform to both planar and curved mounting surfaces;

an adhesive material adapted for application to the attachment surface of the planar base portion of the louver member to provide attachment of the louver member to a selected mounting surface;

a template member adapted for marking attachment locations for the plurality of louver members on the selected mounting surface; and a cleaning material adapted for preparing the selected mounting surface for attachment of the louver members thereto.

19. The louver decoration kit of claim 18, wherein the adhesive material is a tape having opposed adhesive sides.

20. The louver decoration kit of claim 18, wherein the adhesive material is a contained fluid adhesive adapted for application to the flat attachment surface of the planar base portion of the louver member.

* * * * *